March 2, 1971     P. KANDELL ET AL     3,567,367
METHOD OF REMOVING NITROGEN OXIDES FROM GASES
Filed Aug. 20, 1968
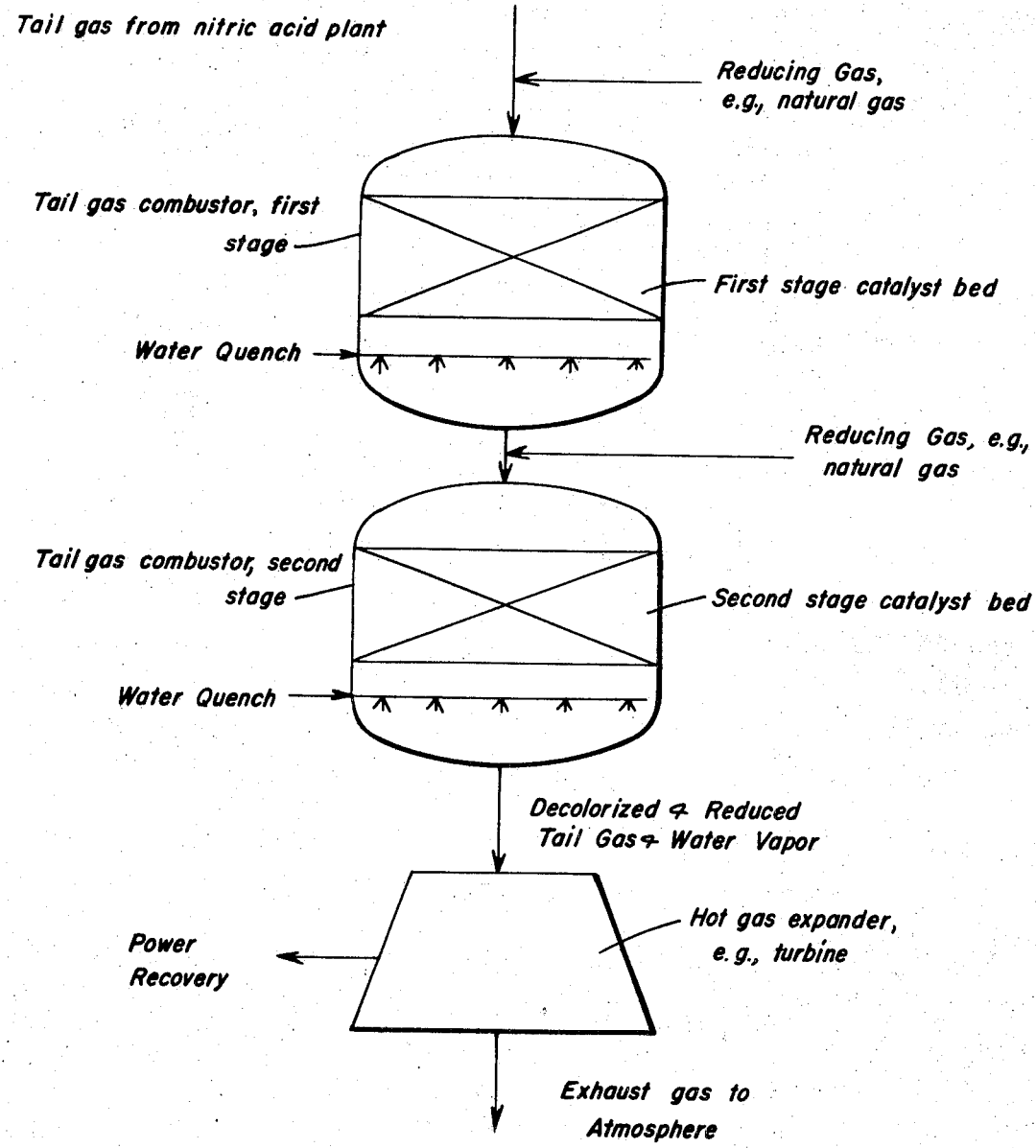
George Nemes
Paul Kandell
INVENTORS
Att'y

United States Patent Office

3,567,367
Patented Mar. 2, 1971

3,567,367
METHOD OF REMOVING NITROGEN OXIDES FROM GASES
Paul Kandell, Matawan, N.J., and George Nemes, New York, N.Y., assignors to W. R. Grace & Co., New York, N.Y.
Filed Aug. 20, 1968, Ser. No. 753,967
Int. Cl. B01d *53/00*
U.S. Cl. 23—2  5 Claims

ABSTRACT OF THE DISCLOSURE

Improvement in the catalytic reduction of nitrogen oxides in tail gas from nitric acid synthesis, wherein water is added to the tail gas prior to and after final reduction so as to give increased reduction, longer catalyst life, and increased energy available for recovery in the treated effluent.

---

In the conventional nitric acid process, ammonia is oxidized over a platinum-rhodium gauze catalyst to form nitrogen oxides which are absorbed into water, producing nitric acid. Spent gas from the top of the absorber tower, commonly called tail-gas, contains some small residual percentage of $NO + NO_2$ plus nitrogen, plus water vapor, plus some free oxygen.

Because of the objections to the nitrogen oxides by the various air pollution authorities, most plants employ tail-gas combustors or abators wherein the residual nitrogen oxides are converted in the presence of a fuel gas over a catalyst to NO and thence reduced to $N_2$. When the operation converts the $NO_2$ only to NO, it is termed decolorizing. Further reduction to $N_2$ is termed total abatement.

As air pollution controls become more severe, the requirements for total abatement will become more and more prevalent.

Total abatement is generally and conventionally carried out by mixing pre-heated tail-gas with a fuel and passing the mixture over a catalyst. For methane fuel or natural gas the preheat temperature is approximately 900° F. whereas for other fuel gas, such as hydrogen, the temperature may be somewhat lower. In passing over the catalyst, the residual oxygen is removed and some reduction of the nitrogen oxides occurs. The outlet temperature of the catalyst bed is limited to about 1450° F. maximum because higher temperatures cause damage and deactivation to the catalyst. Because of the limitation in temperature rise across the bed, the gas is generally cooled to approximately the same temperature as the inlet gas, mixed with additional fuel gas, and passed over a second catalyst bed wherein most of the remaining nitrogen oxides are reduced to $N_2$. Interstage cooling is generally accomplished by a waste-heat boiler or other heat exchanger, the outlet gas from the second catalyst bed is then cooled and sent to a hot gas expansion turbine which recovers power and helps to drive the nitric acid plant process air compressor. The amount by which the gas is cooled is determined by the metallurgy of the hot-gas expansion turbine and is generally limited to about 1000° F. for most commercial units. The cooling is similarly performed in a waste-heat boiler or other heat exchanger. Exit gas from the expansion turbine goes to a vent stack.

The instant invention represents an improvement on the above described tail-gas treatment. In this invention, the hot gas between catalyst stages is cooled with a direct water quench. Also, the hot gas after the second catalyst stage is similarly cooled with a direct water quench. This method of operation accomplishes the following:

(1) The quantity of hot gas to the expansion turbine is increased by evaporation of quench water, thus leading to greater power recovery on the expansion turbine.

(2) The exit gas from the expansion turbine is diluted with water vapor thus further reducing the concentration of residual nitrogen oxides in the stack gas discharged to the atmosphere.

(3) The necessity for a waste-heat boiler or other heat exchanger is eliminated between catalyst stages and again after the second stage, thus reducing the plant cost.

(4) The reduction of NO to $N_2$, which is the more difficult and controlling reaction, is improved as follows (assuming methane fuel gas):

$$5CH_4 + 8NO + 2H_2O \rightleftharpoons 5CO_2 + 8NH_3 \quad (I)$$

$$2NH_3 + 3NO \rightarrow 5/2 N_2 + 3H_2O \quad (II)$$

In the first of these two reactions, the $H_2O$ is provided by the water vapor arising from the direct water quench, and an increase in the amount of this reactant drives the reaction in the forward direction.

The apparatus used in the following example consisted of two conventional combustors each 2½ feet deep, modified to accept water spray nozzles at the outlet. 8 water nozzles spaced around the internal circumference of the shell are used for good dispersion or alternatively sprays can be installed in the outlet piping. The nozzle heads are adjusted to give a fairly fine spray. The two combustors are operated in series.

The drawing shows a simple schematic flow diagram of the process of this invention.

The example illustrates without limiting the invention.

Example 1

The tail gas from a nitric acid absorption tower varies somewhat, but the composition given below is typical:

| | Volume percent |
|---|---|
| $O_2$ | 2.62 |
| $N_2 + Ar$ | 96.47 |
| NO | 0.32 |
| $NO_2$ and $N_2O_4$ | 0.04 |
| $H_2O$ | 0.55 |

This tail gas is fed directly as incoming feed to the first cumbustor chamber, at a rate of about 8500 s.c.f.m., at about 482° C., and at about 104 p.s.i.g. As already noted, the effect of the first catalyst is to remove residual oxygen and to substantially convert $NO_2$ (and $N_2O_4$) to NO. The hot gases leaving the first catalyst bed are therefore substantially free of $NO_2$ and $N_2O_4$.

Water at about 40° C. is now sprayed into this effluent, at the approximate rate of 6 gallons per minute, or about 0.0007 gallon/cubic foot of effluent at standard conditions, and passes to the second catalyst bed (second combustor). Conversion of NO to $N_2$ is rapid and substantial, the NO content dropping to about 400 p.p.m. or less. As the thus treated gas emerges from the second catalyst bed, it is quenched a second time with 0.0006 to 0.0007 gallon of water per s.c.f. of gas. The temperature of the vapor at this point, and as it now exits the second combustor to enter the power recovery section, is about 532–538° C. This effluent is particularly adapted as feed to a turbine to operate compressors for ammonia and/or air, or feed to a waste heat boiler for generation of steam, which steam can be used in the compressors aforesaid, or for other conventional uses.

The effluent from the turbine or waste heat boiler as exhausted finally to the atmosphere generally contains no more than 400 p.p.m. nitrogen oxides and may be substantially less (e.g., 50–100 p.p.m.). It meets nitric acid plant pollution regulations for most areas.

This invention is operable with substantially any conventional tail gas combustors modified as above described that uses a reducing gas, e.g., hydrogen, carbon monoxide, propane, natural gas, or the like. Excellent results are obtained with natural gas (about 95% methane) and tail gas feeds of the following composition range:

| | Volume percent |
|---|---|
| $O_2$ | 1.5–4.5 |
| $N_2+Ar$ | 94.5–97.5 |
| NO | 0.28–0.50 |
| $NO_2+N_2O_4$ | 0.04–0.07 |
| $H_2O$ | 0.45–0.60 |

Instead of two combustors in series, a single combustor with two catalyst beds, each followed by a water quench, can be used.

The type of catalysts used in the two combustor beds is not critical, and any conventional combustor catalyst is suitable, e.g., platinum, nickel, rhodium, and palladium, in any conventional form, e.g., ribbons, pellets, pebbles, honeycomb or the like.

Conventional tail-gas combustors are well known, and have been described, for example, in U.S. Pats. 2,924,504, 2,910,343, 2,975,025, 2,970,034, and others. Industry reviews are given in Chemical Engineering for Jan. 12, 1959, pp. 67–70; and Chemical Week, vol. 98, p. 85 (Feb. 19, 1966).

Tail gas entering the first combustor may require preheating to 482–532° C. in order to undergo efficient treatment in the first catalyst bed. In this respect, the use of this invention requires no modification, since no water is added before the first catalyst bed; which is to say, preheating or the absence thereof is determined without regard to the use of the water-quench features of this invention.

We claim:

1. In the catalytic reduction of nitrogen oxides in a nitric acid tail gas catalytic combustor in which the tail gas is mixed with a reducing gas and passed through a first catalyst bed to reduce $NO_2$ to NO and then through a second catalyst bed to reduce NO to nitrogen and finally passed to a gas expander for energy recovery the improvement in which the vapor between the two catalyst beds and after the second catalyst bed is quenched with water, whereby nitrogen oxide content is further reduced so as not to exceed 400 parts per million, effluent temperature is reduced thereby prolonging catalyst life, and available energy of the effluent is increased.

2. The method according to claim 1 in which the reducing gas is natural gas.

3. The method according to claim 2 in which the tail gas before admixture with reducing gas has the approximate composition:

| | Volume percent |
|---|---|
| $O_2$ | 1.5–4.5 |
| $N_2+Ar$ | 94.5–97.5 |
| NO | 0.28–0.50 |
| $NO_2+N_2O_4$ | 0.04–0.07 |
| $H_2O$ | 0.45–0.60 |

4. The method according to claim 2 in which 0.0006 to 0.0007 gallon of water is added per s.c.f. of gas exiting the first catalyst bed, and 0.0006 to 0.0007 gallon of water is added per s.c.f. of gas exiting the second catalyst bed.

5. The method according to claim 2 in which the temperature of the tail gas prior to entering the first catalyst bed is 482 to 532° C., and in which sufficient water is added to lower the temperature of the final effluent to about 532–538° C.

References Cited

UNITED STATES PATENTS

| 2,785,056 | 3/1957 | Thumm et al. | 23—225 |
| 2,970,034 | 1/1961 | Anderson et al. | 23—2 |
| 3,467,492 | 9/1969 | Newman | 23—2 |

EARL C. THOMAS, Primary Examiner

U.S. Cl. X.R.

23—159